United States Patent Office 3,508,546
Patented Apr. 28, 1970

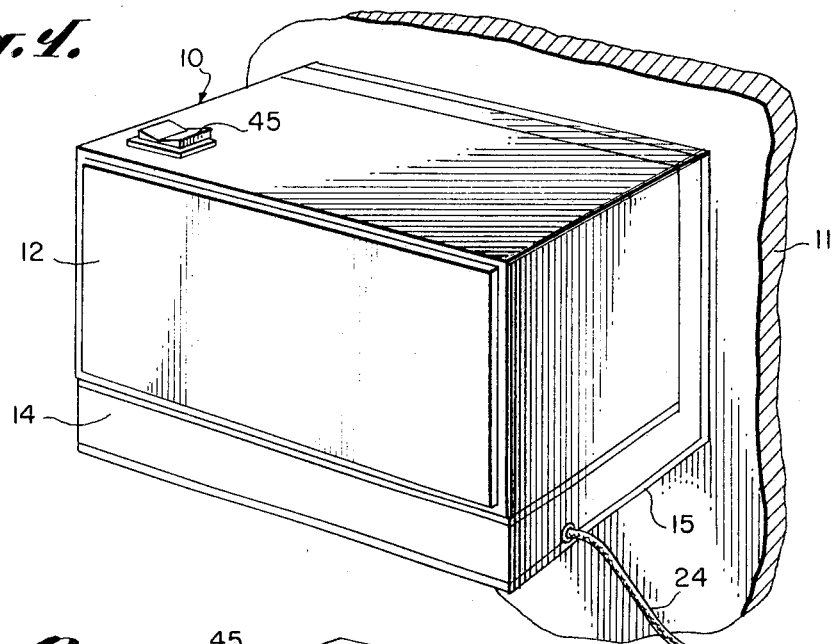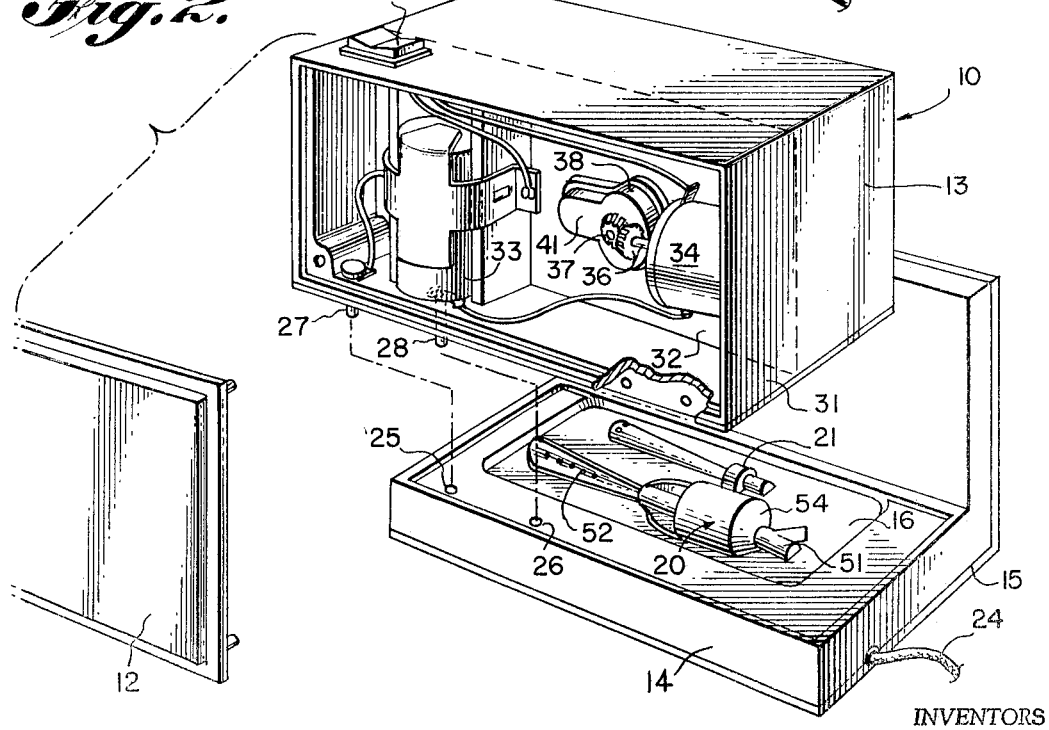

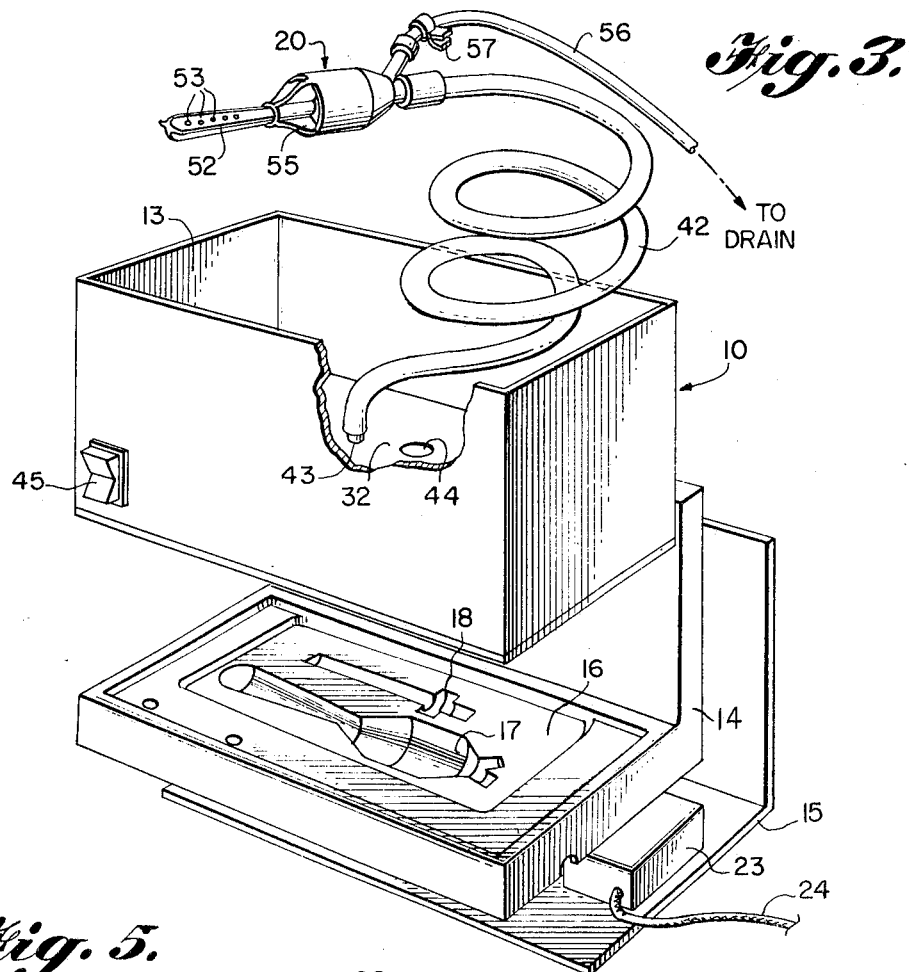
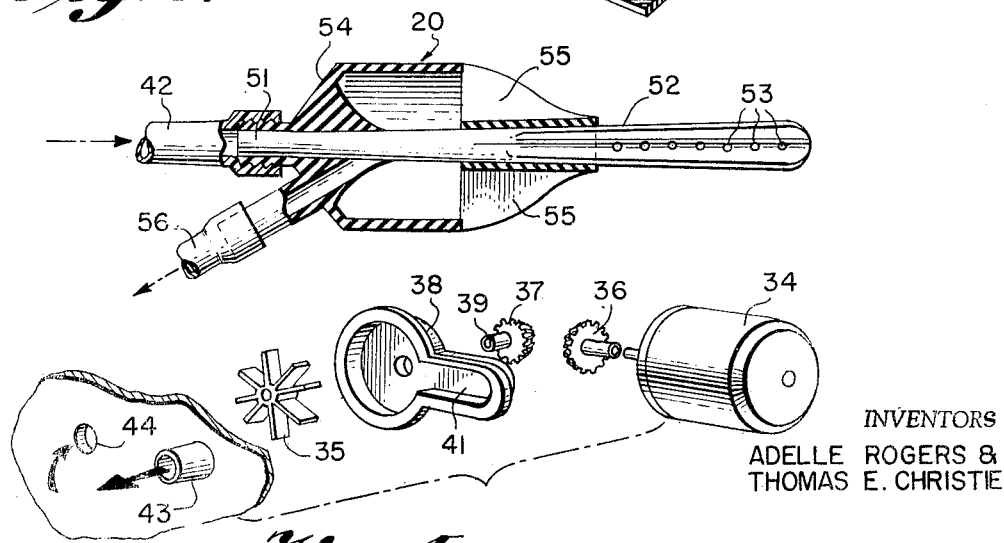

3,508,546
DOUCHE AND ENEMA APPARATUS
Adelle M. Rogers, 253 Greens Farms Road, Greens Farms, Conn. 06436, and Thomas E. Christie, Town House Road, Fairfield, Conn. 06430
Filed June 4, 1968, Ser. No. 734,323
Int. Cl. A61m 1/00
U.S. Cl. 128—230    7 Claims

ABSTRACT OF THE DISCLOSURE

Apparatus for use as a douche or enema utilizing a container which has a portion used as a reservoir presenting a closed appearance when stored on its side, further utilizing a vaned pump rotor, battery operated and recharged during storage, with a nozzle used for douche purposes having a passage for the fluid into the vagina and a controlled opening passage provided for the return of this fluid through an outlet tube.

---

The present invention relates to apparatus used for douche and for enema purposes and more particularly to an attractive storage unit of a portable nature.

Douche and enema apparatus are usually stored in the bathroom and with the present invention an attractive storage container may be used which will also serve a useful purpose when the apparatus is put to use.

In addition, gravity flow devices, such as are shown in the prior art, may require inconvenient placement of the reservoir in order to place the apparatus in operation. With the motor driven apparatus of the present invention, this inconvenience is eliminated.

Also, because of the battery operation of the unit of the present invention, the apparatus does not depend upon the placement of an electric outlet and may be utilized wherever convenient.

Furthermore, the battery, which allows the portability of the present invention, is being continually recharged while the device is not in operation, and during the time when the recharging is taking place the container is stored so as to present an attractive appearance.

In addition, the vaginal syringe nozzle, which is attached by hose to the device, is constructed so that fluid may be induced into the vagina and at the same time drained therefrom to a convenient outlet. In addition, the draining may be controlled so that when a medication is applied it may be caused to remain in the vagina for any desired length of time before being drained therefrom.

The invention will now be described in detail in connection with the accompanying drawings in which:

FIG. 1 is a perspective view of the unit in its stored position and while being recharged, mounted as a wall attached unit;

FIG. 2 is an exploded view of the apparatus positioned as in FIG. 1;

FIG. 3 is another exploded view with the apparatus having the reservoir in an upright position as when in use, and with connections made for the operation of the invention as a douche apparatus;

FIG. 4 is an exploded view of the motor and pump combination shown in FIG. 2; and FIG. 5 is a sectioned view of the vaginal syringe nozzle shown in perspective view in FIG. 3.

Referring first to FIG. 1, therein is shown the douche and enema apparatus of the present invention in its stored position while mounted on a wall 11 and in a position for recharging. FIG. 2 shows an exploded view of this apparatus with all units in the same orientation as in FIG. 1. The reservoir and pumping unit 10 is placed on its side, in which position it is stored. In this way, only the bottom 12 and three of the sides are visible with the open end of the reservoir portion 13 placed against the cover 14 on wall bracket 15 and not visible. The wall bracket cover portion 14 contains a space 16 for storage of the vaginal syringe nozzle 20 and enema syringe nozzle 21 in spaces 17 and 18 provided beneath the reservoir and pumping unit 10. The wall bracket 15 also holds, as shown in the further exploded view of FIG. 3, a charger 23 which may be left connected to an electric outlet through a cord 24 connected to it. This charger 23 is connected to female contacts 25 and 26 through wiring not shown.

With the bottom plate 12 removed in the view of FIG. 2, the lower compartment 31 is shown separated from reservoir 13 by wall 32. In this lower compartment 31 are located an electrically operated pump and power source for the pump. This power source may be composed of rechargeable battery 33 of 1.25 volts and a nickel-cadmium size C type. This battery 33 is connected to male contacts 27 and 28 located so as to cooperate with female contacts 25 and 26 for recharging the battery 33 whenever the unit 10 is placed on its side for storage purposes. Also connected to the terminals of the battery 33 is a DC motor 34 which operates a vaned pump rotor 35 through gearing 36 and 37, shown more clearly in the exploded view of FIG. 4.

With the bottom plate 12 in place on the reservoir and pumping unit 10, which plate 12 need not be removed except for purposes of repair, or replacement of the battery 33 if needed, the unit is rotated 90° from its storage position of FIGS. 1 and 2, and at the same time a vaginal syringe nozzle 20 or enema nozzle 21 is removed from its respective recess in the wall bracket cover 14 and attached to the end of a hose 42, which is usually stored within the reservoir portion 13 of the unit 10. As shown in FIG. 3, the hose 42 has one of its ends connected to hole 43 which is one of two holes 43 and 44 in the bottom wall 32 of the reservoir unit 13, which holes connect into the casing 38 for the vaned pump rotor 35.

Upon the operation of switch 45, which is connected in the circuitry of the electric motor 34 and rechargeable battery 33, the circuit is closed and rotation of the electric motor 34 causes rotation of bevel gear 36 mounted on the shaft of the motor 34, which in turn rotates the bevel gear 37, which is in contact with the bevel gear 36. This second bevel gear 37 has a shaft 39 extending through casing 38 to vaned rotor 35. Sealing means are utilized on shaft 39 of this second bevel gear 37 to prevent leakage of the liquid from the casing 38 into the lower compartment 31 of the reservoir and pumping unit 10. A broken away portion of the bottom wall 32 of the reservoir 13 is shown in FIG. 4 with holes 43 and 44 shown in their relation to the pump casing 38 and vaned rotor 35.

In the operation of the reservoir and pumping unit 10, with a liquid for douche or enema purposes in the reservoir 13, which may contain medication, the unit 10 in the upright position shown in FIG. 3 and with the switch 45 in the ON position, causes the liquid to pass out of the reservoir 13 into the casing 38 through hole 44. The vaned rotor 35 rotated by means of electric motor 34 and bevel gears 36 and 37 forces the liquid into the elongated portion 41 of casing 38 and out through hole 43 in the reservoir bottom 32, to which the hose 42 is connected. The liquid is then forced out through either the douche or enema nozzle, whichever, is connected to the opposite end of the hose 42.

In the case in which the douche nozzle 20 is used, connected as shown in FIG. 3 with further details of the nozzle shown in the sectioned view of FIG. 5, the liquid is forced through hose 42 into straight through passage 51, which connects with a plastic nozzle 52 having holes 53 therein for allowing the expelling of the liquid into the vagina. This plastic nozzle 52 is held in position in a rubber base 54 having radial portions 55 which act as a plug to prevent expelling of the liquid, except through passages around the plastic nozzle 52, which allow the liquid to empty through hose 56 to a convenient drain. On this outlet hose 56, a clamp 57 is positioned for use to control the expulsion of the liquid in cases when medication is to be held temporarily in the vagina. As can be seen, this type of construction allows controlled drainage and adequate drainage of the liquid from the vagina so as to prevent injury or discomfort thereto.

After usage of the apparatus and when the parts are ready for storage, the nozzles 20 and 21 are placed in recesses 17 and 18, respectively, prepared for them in the wall bracket cover 14, and with the hose 42 coiled within the reservoir 13, the reservoir and pumping unit 10 are rotated 90° so that the opening of the reservoir 13 is faced against the vertical portion of bracket cover 14 and bracket 15 and the male contacts 27–28 are inserted into the corresponding female electrical contacts 25–26 so that the battery 33 may be recharged during this storage period.

It will be obvious to those skilled in the art that various changes may be made without departing from the scope of the invention and that the invention is not to be considered limited to what is shown in the drawings and described in the specification.

What is claimed is:
1. A douche and enema apparatus comprising:
   a container having upper and lower compartments separated by a partition,
   said upper compartment being a liquid reservoir with an opening at its top,
   said lower compartment having pumping means located wherein, and a bottom closing said lower compartment,
   a hose connection connected through said upper compartment to said pumping means,
   a nozzle attached on the opposite end of said hose connection from said pumping means,
   a power source connected to said pumping means,
   and right angle supporting means for said container having a vertical wall receiving said container for storage on its side with said open top against said vertical wall and a horizontal portion receiving one side of said upper and lower compartments of said container in said storage position so as to form a compact closed unit when stored.
2. The douche and enema apparatus of claim 1, further characterized by
   said supporting means having nozzle storage space in a depression beneath said container.
3. The douche and enema apparatus of claim 1, further characterized by
   said power source connected to said pumping means being a battery located in said lower compartment, thereby allowing portability of said container.
4. The douche and enema apparatus of claim 1, further characterized by
   said power source being a rechargeable battery located in said lower compartment,
   said supporting means including a battery charger and a first set of electrical contacts connected thereto,
   and a second set of electrical contacts on the side of said container connected to said battery and attaching to said first set of contacts when said container is placed for storage on its side with said open top against said vertical wall.
5. The douche and enema apparatus of claim 1, further characterized by
   said nozzle having inlet passage means connected to said hose connection and drainage means,
   and control means on said drainage means to control the flow therethrough.
6. The douche and enema apparatus of claim 1, further characterized by
   said pumping means including motor means connected to said power source, and a vaned rotor connected to said motor means by a right angle gear driving arrangement.
7. The douche and enema apparatus of claim 1, further characterized by
   said supporting means being a right angle wall mounted bracket with said vertical wall of said supporting means mounted against a wall upon which said bracket is mounted.

References Cited

UNITED STATES PATENTS

| | | | |
|---|---|---|---|
| 2,522,122 | 9/1950 | Kertesz | 128—229 |
| 2,891,543 | 6/1959 | Bidlingmayer | 128—248 |
| 2,908,273 | 10/1959 | Huston | 128—251 |
| 3,044,465 | 7/1962 | Anderson et al. | 128—230 |
| 3,393,673 | 7/1968 | Mattingly | 128—66 |

RICHARD A. GAUDET, Primary Examiner

J. YASKO, Assistant Examiner

U.S. Cl. X.R.
103—134; 128—251